(12) United States Patent
Holliger

(10) Patent No.: US 7,954,240 B2
(45) Date of Patent: Jun. 7, 2011

(54) METHOD FOR REPAIRING DAMAGED PALLETS

(75) Inventor: Robert Holliger, Boniswil (CH)

(73) Assignee: Holliger Paletten Logistik AG, Boniswil (CH)

( * ) Notice: Subject to any disclaimer, the term of this patent is extended or adjusted under 35 U.S.C. 154(b) by 1241 days.

(21) Appl. No.: 11/559,076

(22) Filed: Nov. 13, 2006

(65) Prior Publication Data

US 2007/0107212 A1 May 17, 2007

(30) Foreign Application Priority Data

Nov. 14, 2005 (CH) ..................................... 1818/05

(51) Int. Cl.
 *B21D 47/00* (2006.01)
 *B21D 39/00* (2006.01)
 *B21D 53/00* (2006.01)
 *B65D 19/00* (2006.01)

(52) U.S. Cl. ............... 29/897.31; 29/402.01; 29/402.03; 29/402.04; 29/402.06; 29/402.08; 29/407.05; 29/426.1; 29/426.4; 29/772

(58) Field of Classification Search ............... 29/897.31, 29/402.01, 402.03, 402.04, 402.06, 402.08, 29/402.14, 407.05, 426.1, 426.4, 426.5, 709, 29/712, 772, 281.3
See application file for complete search history.

(56) References Cited

U.S. PATENT DOCUMENTS

| | | | | |
|---|---|---|---|---|
| 3,968,560 A | * | 7/1976 | Vial ................................. | 29/430 |
| 4,743,154 A | * | 5/1988 | James et al. ............... | 414/788.5 |
| 5,201,110 A | * | 4/1993 | Bane ............................. | 29/564.3 |
| 5,211,094 A | * | 5/1993 | Johnson .......................... | 83/495 |
| 5,307,554 A | * | 5/1994 | Johnson et al. ............... | 29/564.3 |
| 5,323,525 A | * | 6/1994 | Johnson ......................... | 29/426.4 |
| 5,375,315 A | * | 12/1994 | Griffith et al. .................. | 29/432 |
| 5,414,924 A | * | 5/1995 | Johnson et al. ............... | 29/564.3 |
| 5,555,617 A | * | 9/1996 | Pope .............................. | 29/772 |
| 5,848,459 A | * | 12/1998 | Minick ......................... | 29/426.5 |
| 6,058,586 A | * | 5/2000 | Bowling et al. ............ | 29/402.11 |
| 6,687,970 B2 | * | 2/2004 | Waechter et al. ............ | 29/426.4 |
| 6,763,567 B2 | * | 7/2004 | Smith et al. ..................... | 29/430 |
| 6,829,822 B1 | * | 12/2004 | Minick ........................... | 29/772 |
| 6,865,975 B2 | * | 3/2005 | Waechter et al. ............... | 83/425 |
| 7,117,586 B2 | * | 10/2006 | Dykstra et al. .................. | 29/772 |
| 2004/0187286 A1 | * | 9/2004 | Smith et al. ..................... | 29/430 |

FOREIGN PATENT DOCUMENTS

WO WO 2004052739 A1 * 6/2004

* cited by examiner

*Primary Examiner* — Jermie E Cozart
(74) *Attorney, Agent, or Firm* — Maginot, Moore & Beck LLP

(57) ABSTRACT

A multi-step method to repair damaged wooden pallets includes in a first step, the connector members of the pallet element to be replaced are cut through by means of a band saw and then removed. In a subsequent step, both the partially disassembled pallet as well the new pallet elements are transferred into an assembly station, where the new pallet elements are attached to the pallet from the top side. Preferably, damaged bottom parts of the pallet are removed as a module Before the replacement module is attached, preferably the position of the connector elements still present in a top deck board member is electronically scanned, such that the new connector members can be applied in a position offset to the existing connector members.

13 Claims, 3 Drawing Sheets

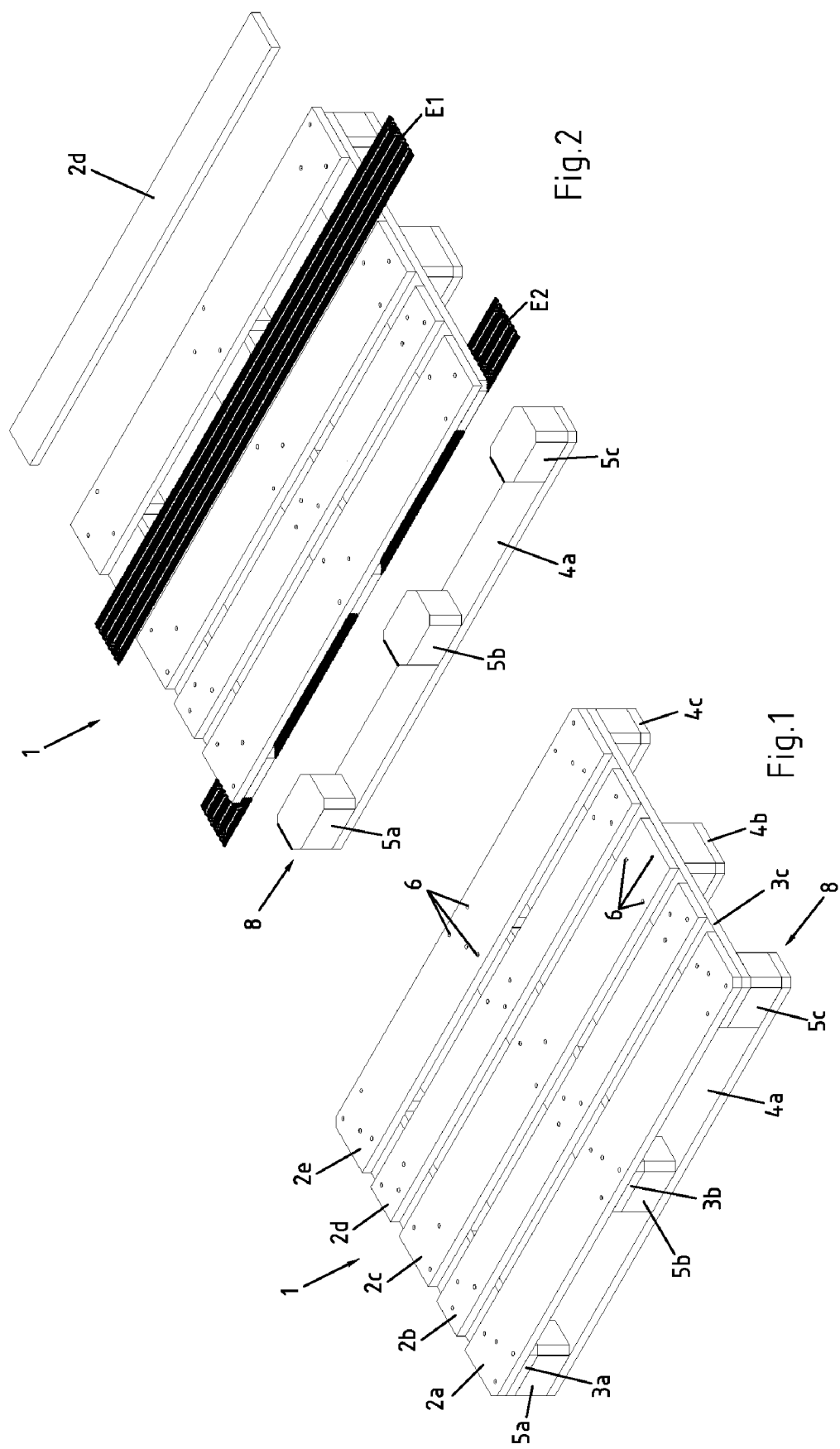

METHOD FOR REPAIRING DAMAGED PALLETS

BACKGROUND

The present invention refers to a method of repairing pallets whose elements are attached to each other by means of connector members, particularly of EURO wood pallets having five top deck board members, three stringer board members and three bottom deck board members, whereby the bottom deck board members are attached to the stringer board members by means of connecting block members and whereby the afore mentioned pallet members are attached to each other by means of connector members, particularly nails. Moreover, the invention refers to an assembly for performing the above mentioned method, with a disassembly station for cutting through the connector members fixing the pallet elements to each other, with an assembly station for attaching the new pallet elements as well as with an apparatus for applying new connector members while the pallet is in the assembly station.

The German Patent Publication DE-A-43 08 580 discloses a method and an apparatus for repairing damaged pallets. The damaged pallet is positioned and fixed on a machine table with its top side facing downwards. Thereafter, the damaged connecting blocks and board members are cut out with a separating device that is movable in three coordinate axes. The separating device comprises a machine head provided with a vertically running drive shaft. At the end of the drive shaft, a rotating circular saw blade is attached. The diameter of the circular saw blade is chosen such that it is smaller than the distance between the rows of connecting block members extending in longitudinal direction. Thus, the circular saw blade can be moved into the space between two adjacent rows of connecting block members extending in longitudinal direction, with the result that the damaged elements of the pallet can be selectively sawn off. Upon separating the damaged elements, the connector means, —nails —, are cut through. After the damaged elements having been removed, the pallet is transferred to a supply and assembly station where the elements to be replaced are fed to the corresponding location and positioned. The real attachment of the new parts is performed by means of two nailing devices, simultaneously driving in nails from the top and from the bottom.

The German Patent Publication DE-A-198 22 229 also discloses a method and an apparatus for repairing damaged wooden pallets. According to this publication, in a first step, the damaged board members and/or skids are separated from the pallet to be repaired. In a second step, the new parts are aligned to the pallet and thereafter nailed thereto. In a further step, the pallets are pressed, such that nails not fully driven in and board members not fully seated are brought into proper position. The apparatus for performing these method steps comprises a feed conveyor for feeding in the pallets, a destacker for singularizing the pallets, a disassembly station for selectively separating damaged parts, an assembly station for replacing the damaged parts, a centering and nailing station for attaching the replaced parts as well as a pressing station for pressing in protruding nails and not fully seated board members.

It is the object of the present invention to improve a method and an assembly for repairing damaged pallets in such a way that the pallets can be repaired quickly, simply and reliably.

To meet these and other objects, the invention provides a method of repairing pallets whose elements are attached to each other by means of connector members, particularly of EURO wood pallets having five top deck board members, three stringer board members and three bottom deck board members. In these pallets, the bottom deck board members are attached to the stringer board members by means of connecting block members and the afore mentioned pallet members are attached to each other by means of connector members, particularly nails. According to the invention, in a first method step, the connector members of the pallet member to be replaced or of the pallet members to be replaced are cut through and the pallet member to be replaced or the pallet members to be replaced is/are removed. In a subsequent method step, both the new pallet members and the partially disassembled pallet are transferred to an assembly station, and in a further subsequent method step, the new pallet members are attached in the assembly station to the pallet by applying new connector members, whereby all new connector members are applied either from the top side of the pallet or from the bottom side of the pallet.

To further meet these and other objects, the invention also provides an assembly for performing the afore mentioned method, with a disassembly station for cutting through the connector members fixing the pallet elements to each other, with an assembly station for attaching the new pallet elements as well as with an apparatus for applying new connector members while the pallet is in the assembly station. According to the invention, a testing station is provided in front of the assembly station, said testing station comprising means for recognizing missing pallet elements and/or means for recognizing the position of connector elements present in one or several top deck board members of a partially disassembled pallet One basic feature of the invention may be seen in the fact that, in a first method step, the connector members of the pallet members to be replaced are cut through, that, in a subsequent method step, both the new pallet members and the partially disassembled pallet are transferred to an assembly station, and that, in a further subsequent method step, the new pallet members are attached in the assembly station to the pallet by applying new connector members, whereby all new connector members are applied from the top side of the pallet. In order to ensure that the connector members can be applied exclusively from the top side of the pallet, the pallet is preferably repaired by replacing pallet modules, whereby a damaged bottom deck board member is removed always in the form of a skid, i.e. together with the three assigned connecting block members. Thus, a new skid can be attached to the pallet easily from the top side thereof. Preferably, prior to attaching a new skid, the position of the connector elements still present in the top deck board member above the new skid to be attached is scanned and stored, such that the new connector members can be applied in a position offset to the already present connector members. This is an important prerequisite for a reliable and durable attachment of the new skid, because, in this way, the danger is eliminated that the new connector members are deflected or even burst off during their application by the already present connector members. In order to recognize whether or not any elements and modules, respectively, of the pallet are missing and, if positive, which elements and modules, respectively, preferably an automatic testing station is provided. This testing station preferably is also provided with sensors for scanning the position of connector elements still present in the top deck board members. By the aforementioned measures, simultaneously the prerequisite is created for an essentially fully automated repair of the pallets.

DESCRIPTION OF THE FIGURES

In the following, an embodiment of the apparatus according to the invention will be further described, with reference to the accompanying drawings, in which:

FIG. 1 shows a perspective view of a pallet;

FIG. 2 shows a perspective view of a partially disassembled pallet;

DESCRIPTION OF THE ILLUSTRATED EMBODIMENTS

Figure 3:
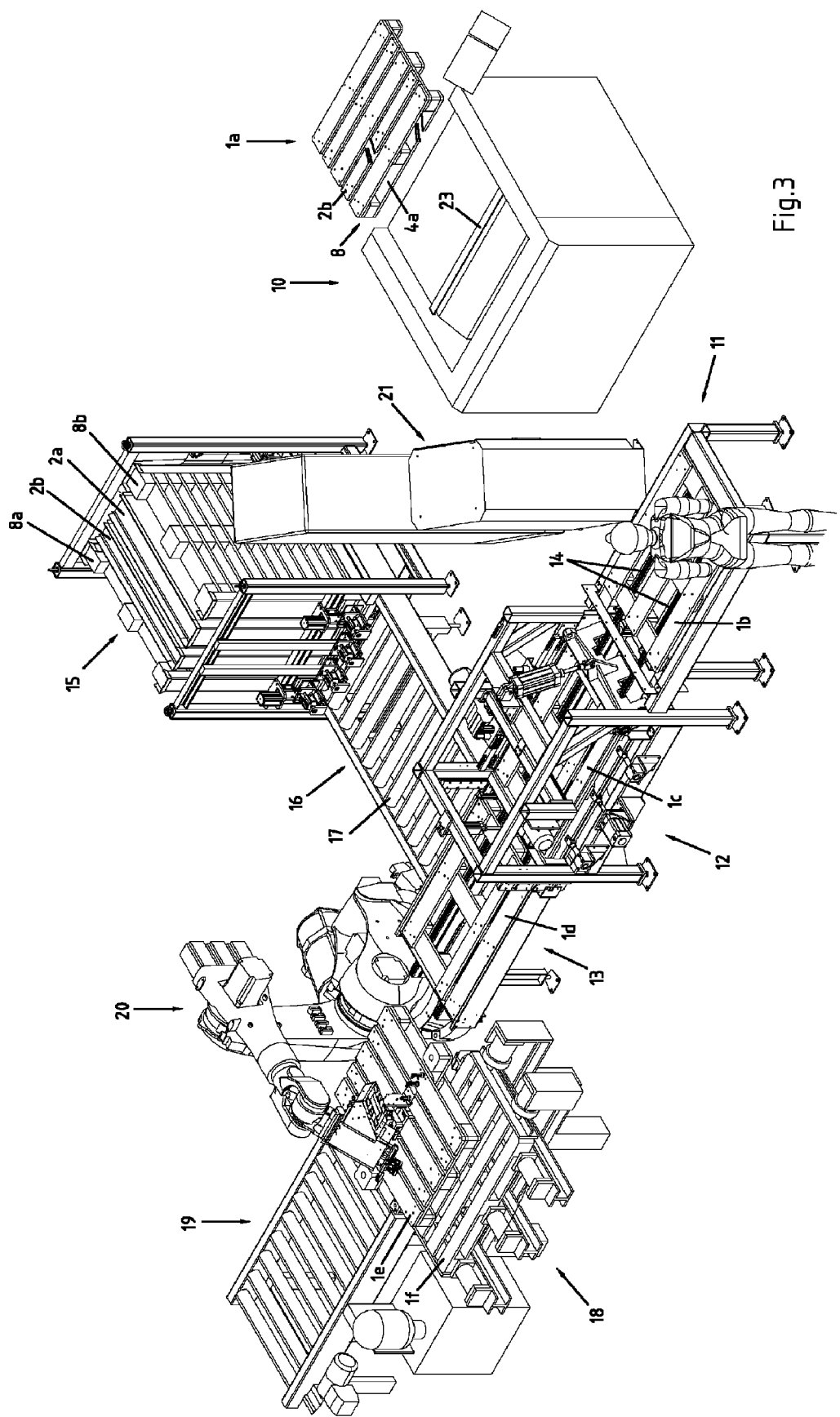
FIG. 3 shows a schematic overview of a pallet repair facility.

FIG. 1 shows a pallet 1 in a perspective view. The Europallet 1 shown in the drawing is made exclusively of wooden components and comprises five top deck board members 2a-2e, running in longitudinal direction, three stringer board members 3a-3c running crosswise to and below the top deck board members 2a-2e, as well as three bottom deck board members 4a-4c running in longitudinal direction. Each of the three bottom deck board members 4a-4c is fixed to the three stringer board members 3a-3c by means of three block members 5a-5c. Regarding the five top deck board members 2a-2e, the two inner top deck board members 2b, 2d are narrower than the two outer top deck board members 2a, 2e and the central top deck board member 2c. The individual elements of the pallet are fixed to each other by means of connectors, preferably in the form of nails 6, whereby nails 6 are driven in both from the top side and from the bottom side of the pallet 1. The nails 6 driven into the pallet 1 from the top side thereof attach the particular top deck board member 2a-2e to the particular stringer board member 3a-3e located there below as well as to the assigned block member 5, while the nails 6 driven into the pallet 1 from the bottom side thereof attach the particular bottom deck board member 4a-4c to the assigned block member 5. In other words, a nail 6 driven into the pallet 1 from the top thereof penetrates both a top deck board member as well as a stringer board member and is seated in the block member 5, while a nail 6 driven into the pallet 1 from the bottom thereof penetrates a bottom deck board member and is seated in the block member 5 as well. It is understood that the nails 6 driven into the pallet from the bottom thereof are not visible in FIG. 1.

FIG. 2 shows a pallet 1 in a partially disassembled state. In order to remove a broken element, e.g. a damaged or broken top deck board member 2d, from the pallet 1, the corresponding nails 6 have to be cut through. This is accomplished by cutting the nails 6 attaching the particular top deck board member 2d to the pallet 1 at a location immediately above the three stringer board members 3a-3c. In order to be in a position to selectively remove each of the three inner top deck board members 2b, 2c, 2d, a band saw blade is used whose width is less than the distance between two adjacent top deck board members 2a-2b; 2b-2c; 2c-2d; 2d-2e (FIG. 1), but which is longer than the top deck board members 2a-2e. The plane in which the band saw blade moves for cutting through the nails 6 attaching the particular top deck board member 2d is schematically shown in FIG. 2 and provided with reference numeral E1. Upon cutting through the connectors, attention is paid to the fact that the elements remaining on the pallet 1, in particular the stringer board members, are not damaged.

If the need arises, also at least one of the two stringer board members 3a, 3c can be removed by cutting through the nails both above and below the particular stringer board member 3a, 3c. In this case, the cutting plane of the saw blade is rotated by 90° with regard to the two cutting planes E1, E2 shown in FIG. 2.

Preferably, a damaged bottom deck board member 4a and/or a damaged block member 5 is not removed individually, but as a module in the form of a skid 8. In other words, the particular bottom deck board member, for example 4a in FIG. 1, is always removed together with the three block members 5a, 5b, 5c attached thereto. For removing the skid 8, the saw blade is moved into the plane E2, thereby cutting through the nails 6 immediately below the stringer board members 3a-3c. In this case as well, attention is paid to the fact that the stringer board members remaining on the pallet 1 are not damaged. The removal of a skid 8 as a module has the advantage that the replacement skid can be attached to the pallet 1 from the top side thereof, as well be explained in more detail herein after.

FIG. 3 shows a perspective view of an assembly for repairing damaged pallets as seen from an elevated position. That assembly will be designated as pallet repair facility in the following description.

The pallet repair facility essentially comprises a disassembly station 10, a feeding station 11, a testing station 12, a transfer station 13, a conveyor means 14, a spare parts magazine 15, a spare parts transfer station 16, a spare parts conveyor 17, an assembly station designed as a nailing station 18, an outlet conveyor 19, a robot 20, as well as a control unit 21. Further shown is a pallet 1a which is to be repaired; in the present example, the pallet 1a has a damaged top deck board member 2b and a damaged skid 8. Particularly, the bottom deck board member 4a of the skid 8 is broken.

The operation of the pallet repair facility can be further explained as follows:

First, the damaged pallet 1a is treated in the schematically shown disassembly station 10, insofar as the damaged elements of the pallet 1a, in the present example the top deck board member 2b and the skid 8, are removed from the pallet 1a. The disassembling of the pallet 1a is performed as has been previously described. To begin with, the connectors, i.e. the nails 6, of the top deck board member 2b as well as of the skid 8 are cut through by means of a band saw blade 23 moving in the planes E1 and E2, respectively, (FIG. 2) and the damaged elements 2b, 8 are removed. Thereby, the band saw blade 23 is adjustable regarding its height position in at least two steps. Particularly, the lower step, i.e. the lower height position, is chosen such that, upon feeding a pallet 1a into the disassembly station 10, the nails are cut immediately below a stringer board member, while the upper step, i.e. the upper height position, is chosen such that the nails are cut immediately above a stringer board member, respectively. In any case, the height positions are determined such that possibly the element to be removed is damaged or cut by the band saw blade, but not the elements that remain attached to the pallet, particularly not the stringer board members.

As previously mentioned, if appropriate, the one or the other one of the two lateral stringer board members can be removed by cutting the nails both below and above the particular stringer board member. To this end, the pallet 1a has to be fed into the disassembly station in a position rotated by 90° around its vertical axis.

Preferably, the elements removed from a pallet 1a to be repaired are fed into a recycling process, not further described herein. Once the damaged elements or modules of the pallet 1a are removed, the partially disassembled pallet 1b is transferred to the feeding station 11. In the present example, this step is performed manually; however, it is also possible to provide suitable means for automatically performing this step.

The partially disassembled pallet 1a, thereafter, is moved by means of the conveyor 14 from the feeding station 11 to the testing station 12. The conveyor means 14 can be, for example, a chain conveyor. In the testing station, it is determined by means of suitable sensor means which elements and/or modules of the pallet 1c are missing. Generally, it has to be determined only which particular basic module or modules is/are missing and is/are to be replaced. Basically, four different basic modules are provided which all are stocked in the spare parts magazine 15. As basic modules, two skid modules 8a, 8b with different widths and two top deck board members 2a, 2b with different widths are provided. As can be seen in FIG. 3 of the drawings, the skid modules 8a, 8b are positioned in the spare parts magazine 15 in such a way that the bottom deck board member of a skid module 8a, 8b is at the bottom, the three assigned block members towering above the surface of the bottom deck board member.

The sensors used for determining which basic module and modules, respectively, is/are missing will be further described herein after.

Moreover, the pallet 1c still being in the testing station 12, the nail pattern of the pallet 1c is scanned by determining the position of each nail with regard to a reference point of the pallet 1c, e.g. a corner thereof. Preferably, not the entire nail pattern is scanned, but only the position of those nails which are present in a top deck board member above a removed skid module, i.e. in a position where a new skid module has to be attached. In other words, only the position if those nails and nail heads, respectively, has to be scanned which are located in one of the three top deck board members below which a skid module has been removed. Consequently, if no skid module has been removed, it is not necessary to scan the position of the nails.

A special case is a wiggly or wobbly pallet in which no part or element is damaged, but in which the pallet is no longer stable enough because for example one or more top deck board members or one or more skid modules are loose. In such a case, the entire pallet is reinforced by driving in additional nails. However, first the existing nail pattern has to be scanned such that new nails can be driven in a somewhat offset position.

Both the existing nail pattern as well as the information regarding missing elements that have to be replaced is electronically transmitted from the testing station 12 to the control unit 21. Preferably, first it is determined which of the four basic modules is/are missing and only thereafter the pattern of the nails located in the region of a top deck board member above a missing basic module is scanned.

A scanning of the nail pattern in the case of a missing skid module is of particular importance because the nail heads are still present in the top deck board member above the new skid module to be attached. Consequently, in the subsequent nailing operation, attention has to be paid to the fact that the new nails are driven in offset to the already (at least partially) present nails. If a nail to be driven into the top deck board member hits the nail head of an existing old nail of the top deck board member, there is a danger that the new nail is bent or distorted, or that it will be driven obliquely into the pallet, with the result that no firm attachment of the new skid module is ensured. This is particularly true also in the case of a wiggly or wobbly pallet.

However, if only a top deck board member has to be replaced, the nail heads at the top side of the pallet are no longer present because the old, damaged top deck board member including the nail heads has been removed. In this case, only the nail shafts are still present in the pallet which do not pose any problems, as experience has shown.

For scanning the nail pattern, preferably inductive sensors are used by means of which the position of nails, usually made of steel, can be exactly determined. The position of the individual nails is recorded with regard to a reference point of the pallet, for example with regard to a certain corner of the pallet. To determine whether a top deck board member or several top deck board members is/are missing, as well as to determine whether one or more of the skid modules is/are missing, the testing station is provided both with light barrier sensors and with mechanically actuated contact switches.

After testing the pallet 1c in the testing station 12, the partially disassembled pallet 1c is further moved to the transfer station 13 by means of the conveyor means 14. Before the partially disassembled pallet 1d is transferred from the transfer station 13 to the nailing station 18, if appropriate, a new skid module is fed by the robot 20 from the spare parts transfer station 16 to the nailing station 18 and deposited there in a predetermined position. Thereafter, the partially disassembled pallet is transferred by means of the robot 20 from the transfer station 13 to the nailing station 18, in such a way that the pallet is correctly positioned with regard to the new skid module. Subsequently, and if required, one or more of the top deck board members can be transferred by means of the robot from the spare parts transfer station 16 to the nailing station 18 and positioned on the pallet already present in the nailing station 18. Now, the pallet 1f is exactly positioned and firmly hold in position by pressing it against stop members. The exact design of the nailing station 18 will be further explained herein after, with reference to FIG. 4. The robot 20 is provided, at its front side, with gripping means that enable a reliable gripping both of individual pallet elements and of a partially disassembled pallet.

Once the pallet 1f is both positioned and fixed in the nailing station 18, the new elements and modules, respectively, are nailed to the pallet 1. The nailing operation is performed by means of the robot 20 by driving the nails, from the top side of the pallet, through the particular top deck board member and stringer board member into the corresponding block member of the skid. The supply of nails is ensured by a nail magazine (not shown) from which the robot 20 takes the number of nails required for a particular nailing operation. Due to the fact that the pallet 1f is under load and pressed into a predetermined shape during the nailing operation, it can be ensured that the final dimensions of the pallet 1f are within predetermined nominal values after the new elements and modules, respectively, have been attached.

Once the new elements and modules, respectively, have been nailed to the pallet 1f, the pallet 1f thereby having been completely rebuilt, the repaired pallet 1e is removed from the nailing station 18 by means of the robot 20 and transferred to the outlet conveyor 19 which, in turn, transfers the pallet in a checking station, not further shown in the drawings. In that checking station, it is checked whether or not the pallet is within the predetermined dimension limits, i.e. whether or not the length, width and height of the pallet correspond to the standard values. Moreover, the clearance between the block members is checked, this value being important for inserting the forks of a fork lift truck.

Even if "new" elements have been mentioned before, it is understood that such elements do not have to be compellingly factory fresh parts, but can be used and in good condition or rebuilt parts in good working order. Instead of nails, for example nail screws, screws or similar connectors can be used for attaching the new pallet elements and/or modules.

The robot is designed to fulfill multiple tasks; for example, it is responsible for feeding new parts and elements to the nailing station, for transferring partially disassembled pallets from the transfer station to the nailing station, for the real nailing operation and for subsequently transferring repaired pallets from the nailing station to the outlet conveyor.

Finally, the repaired pallet is fed to a pressing station in which the pallet is put under load from the top and/or from the bottom in such a way that possibly protruding nails are finally pushed into the pallet.

Figure 4:
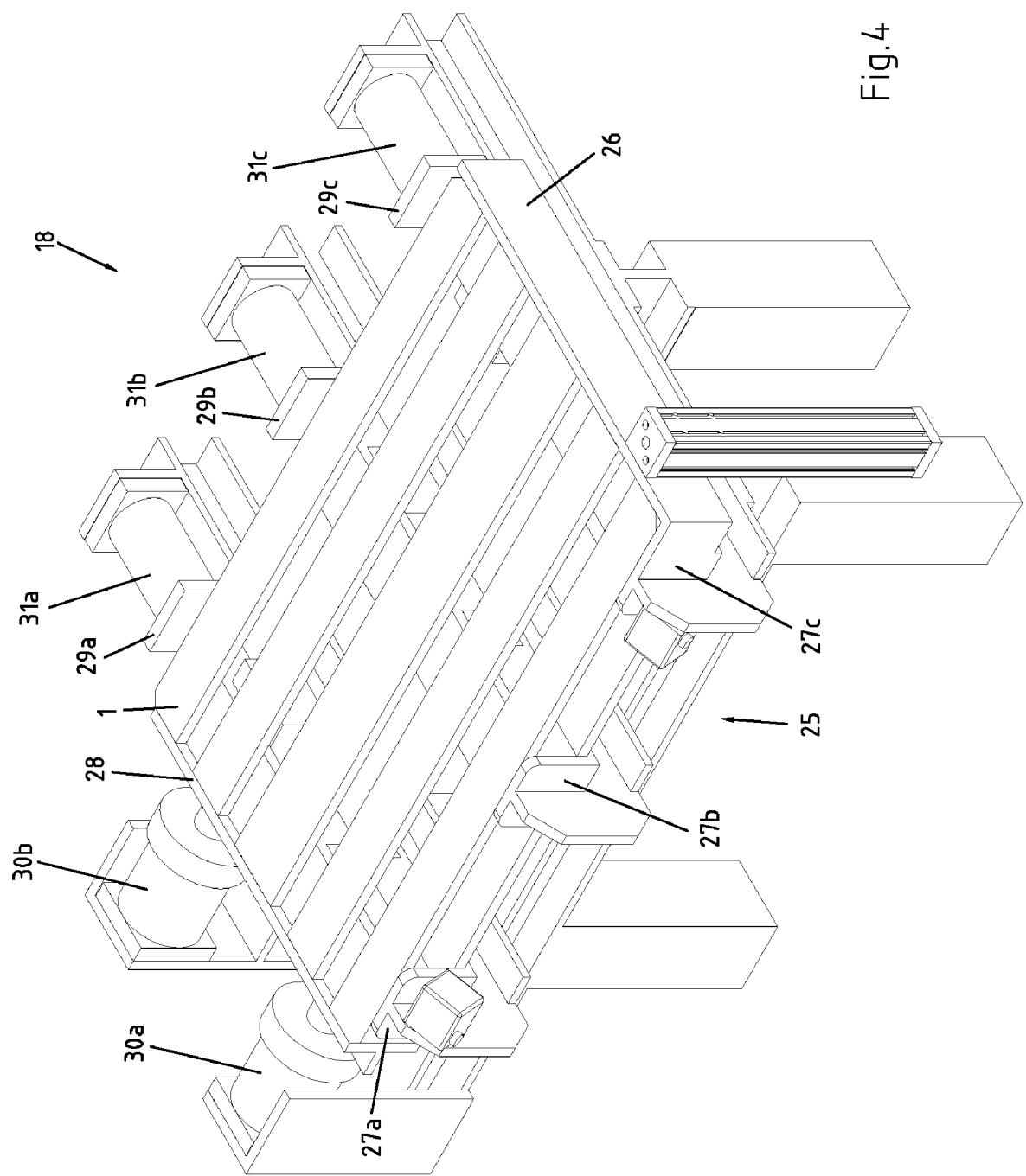
FIG. 4 shows a perspective top view of an assembly station.

FIG. 4 shows the nailing station 18 in a perspective view. The nailing station comprises a table-like base member 25 provided with a fixed strip member 26 forming a first stop member for one of the front faces of the pallet 1. Offset by 90° with regard to the strip member 26, three fixed angular members 27a-27c are provided, serving as stop members for the one longitudinal side of the pallet 1. The position of these three angular members 27a-27c corresponds to the position of three block members 5a-5c located along one of the lateral bottom deck board members (FIG. 1). A further strip member 28 is located opposite to the fixed strip member 26 and can be moved towards and away from the pallet 1. Opposite to the three fixed angular members, three movable plate members 29a-29c are provided. Both the movable strip member 28 and the three movable plate members 29a-29c serve for positioning and fixing the pallet, i.e. once the strip member 28 and the moving plate members 29a-29c are in their operating position, the pallet is pressed against the fixed stop members 26 and 27a-27c. For operating and displacing, respectively, the strip member 28 and the plate members 29a-29c, hydraulic cylinders 30a, 30b, 31a-31c are provided. The operation of these hydraulic cylinders 30a, 30b, 31a-31c is preferably accomplished by means of the control unit 21 as well. Once both the strip member 28 and the plate members 29a-29c are brought into their operating positions shown in FIG. 4, the pallet 1, together with the new pallet elements possibly not yet attached, is/are pressed against the fixed stop members 26, 27a-27c and thereby both aligned and firmly held in position. Moreover, all eight peripheral block members of the three skids are aligned. Additionally, by displacing the strip member 28 as well as the plate members 29a-29c, it is ensured that the outer dimensions of the pallet are within predetermined limits. For monitoring the outer dimensions of the pallet, additional sensors may be provided, if appropriate.

Due to the fact that all elements and modules of a pallet that have to be replaced can be attached to the pallet from the top thereof, the handling of the pallets is very simple and the throughput of the entire repair facility is comparatively high.

The invention claimed is:

1. A method of repairing a pallet having pallet members including five top deck board members attached to three stringer board members and three bottom deck board members attached to the stringer board members by connecting block members, wherein the pallet members are attached to each other by connector members, comprising:
    cutting through the connector members of at least one pallet member to be replaced and removing the at least one pallet member to be replaced to create a partially disassembled pallet;
    transferring new pallet members and the partially disassembled pallet to an assembly station;
    scanning and storing positions of connector members present in the partially disassembled pallet; and
    applying new connector members in a position offset with regard to the connector members already present in the partially disassembled pallet to attach the new pallet members to the partially disassembled pallet in said assembly station.

2. The method according to claim 1, wherein the partially disassembled pallet, before being transferred to the assembly station, is fed into a testing station in which absences of pallet members are registered and/or in which positions of connector members present in one or several top deck board members are at least partially scanned and stored.

3. The method according to claim 1, wherein the at least one pallet member to be replaced is a top deck board member, the top deck board member removed by cutting through the connector members at a height level immediately above a stringer board member.

4. The method according to claim 1, wherein the at least one pallet member to be replaced is a new top deck board member, a new top deck board member to be attached to a partially disassembled pallet is transferred to the assembly station after a partially disassembled pallet is transferred thereto and, subsequently, the new top deck board member is put on top of the partially disassembled pallet.

5. The method according to claim 4, wherein the new connector members used to attach the new top deck board member are applied from a top side of the partially disassembled pallet.

6. The method according to claim 1, wherein the partially disassembled pallet received in the assembly station is firmly held and put under load such that the contour of the pallet is within a norm while the new connector members are applied.

7. The method according to claim 1, wherein the pallet being repaired is repaired by a modular exchange of pallet members, whereby one or more top deck board member(s) and/or one or more skid(s), and a bottom deck board and three connecting block members associated therewith, are replaced.

8. A method of repairing a pallet having pallet members including five top deck board members attached to three stringer board members and three bottom deck board members attached to the stringer board members by connecting block members, wherein the pallet members are attached to each other by connector members, comprising:
    cutting through the connector members driven into the connecting block members assigned to a skid to be replaced;
    removing the skid to be replaced to create a partially disassembled pallet;
    transferring a new skid to an assembly station;
    transferring the partially disassembled pallet to the assembly station and putting the partially disassembled pallet on top of the new skid; and
    applying new connector members to attach the new skid to the partially disassembled pallet within said assembly station, wherein all new connector members are applied from a top side of the partially disassembled pallet.

9. The method according to claim 8, wherein the connector members provided for attaching the new skid are driven through the top deck board member and through the stringer board member into the connecting block member of the new skid.

10. The method according to claim 8, wherein the skid is removed by cutting through the connector members driven into the connecting block members assigned to the skid at a height level immediately below a stringer board member.

11. The method according to claim 8, wherein the partially disassembled pallet, before being transferred to the assembly station, is fed into a testing station in which absences of pallet members are registered and/or in which positions of connector members present in one or several top deck board members are at least partially scanned and stored.

12. The method according to claim 8, wherein the partially disassembled pallet received in the assembly station is firmly held and put under load such that the contour of the pallet is within a norm while the new connector members are applied.

13. The method according to claim 8, wherein the pallet being repaired is repaired by a modular exchange of pallet members, whereby one or more top deck board member(s) and/or one or more skid(s), and a bottom deck board and three connecting block members associated therewith, are replaced.

* * * * *